United States Patent [19]

Lappington et al.

[11] 4,060,714

[45] Nov. 29, 1977

[54] INPUT SENSOR CIRCUIT FOR A DIGITAL ENGINE CONTROLLER

[75] Inventors: John P. Lappington, Huntsville; Leroy Shafer, Toney, both of Ala.

[73] Assignee: Chrysler Corporation, Highland Park, Mich.

[21] Appl. No.: 688,217

[22] Filed: May 20, 1976

[51] Int. Cl.$^2$ ........................ F02P 5/04; G06F 15/20; G06G 7/70

[52] U.S. Cl. ............................... 364/431; 123/117 D; 123/148 E

[58] Field of Search ........................ 235/150.2, 150.21; 340/172.5; 123/32 EA, 32 AE, 148 E, 117 R, 117 D

[56] References Cited

U.S. PATENT DOCUMENTS

| | | | |
|---|---|---|---|
| 3,846,760 | 11/1974 | Ironside | 235/150.2 X |
| 3,898,962 | 8/1975 | Honig et al. | 123/148 E X |
| 3,904,856 | 9/1975 | Monpetit | 235/150.21 |
| 3,906,207 | 9/1975 | Rivere et al. | 235/150.21 X |
| 3,969,614 | 7/1976 | Moyer et al. | 235/150.21 |

*Primary Examiner*—Joseph F. Ruggiero
*Attorney, Agent, or Firm*—Baldwin & Newtson

[57] ABSTRACT

In one embodiment, a circuit parameter of a sensor varies in accordance with an input useful in controlling an event associated with operation of an engine, for example, spark timing. The sensor is connected in an input sensing circuit characterized by a first order differential equation exhibiting an exponential transient whose time constant is representative of the circuit parameter, and hence of the input being sensed. A step function input is applied to the sensing circuit to cause the occurrence of an exponential transient, and concurrently a digital counter circuit begins counting clock pulses. The transient is compared against a predetermined reference, and when a predetermined relationship between the reference and the transient is attained, the counter circuit ceases counting pulses. The accumulated count is in the form of a binary word which may be used directly by a digital microprocessor in calculations for controlling the event.

26 Claims, 9 Drawing Figures

INPUT SENSOR CIRCUIT FOR A DIGITAL ENGINE CONTROLLER

BACKGROUND AND SUMMARY OF THE INVENTION

The present invention pertains to engine control systems and in particular to input sensor circuits which are especially useful in electronic engine control systems of the digital type.

The application of electronic controls to engine control systems accomplishes substantial improvements in engine performance. With the use of electronics a large number of inputs may be sensed, and the information obtained therefrom utilized to provide precise control of selected events associated with operation of the engine. An outstanding example is the Chrysler Electronic Lean Burn Engine which monitors, via input sensors, various engine operating conditions to precisely control the timing of spark ignition. This remarkable engine achieves reduced exhaust emissions and improved fuel economy without the use of other devices (such as catalytic converters, exhaust gas recirculation) which had heretofore been required on internal combustion engines to meet Federal emission standards and which lowered fuel economy. The Chrysler Electronic Lean Burn Engine, as currently manufactured and sold by Chrysler Corporation, utilizes several analog sensors and analog circuits for converting the sensor information into analog electrical signals utilized in controlling spark timing.

The desirability of incorporating a digital microprocessor in an electronic engine control system has heretofore been recognized. While engine control systems utilizing digital microprocessors are known in the art, a serious impediment to their commercial feasibility is that suitable input sensors are not available. Although in some instances there do exist digital sensors which can provide digital inputs to a microprocessor, these digital sensors are generally very expensive. Less expensive digital sensors do not possess the requisite accuracy and ruggedness which are necessary for use in an engine control system. Analog sensors can be used in certain instances but these require complicated analog-to-digital converter circuits. Thus, while digital microprocessor technology has developed to a point where microprocessors are suited for engine control application, the technology relating to input sensors for these microprocessors has not kept pace.

The present invention is directed toward input sensor circuits for a digital microprocessor which do not require digital sensors, but rather utilize existing analog sensors. However, input information is provided in a digital form which may be directly acted upon by the microprocessor. With the present invention, input sensor parameters representative of selected inputs are converted into binary words. By way of example, conventional resistive, capacitive, inductive, or voltage type sensors may be used and the parameters thereof converted into corresponding binary words which may be acted upon directly by the microprocessor in its calculations for the particular engine control function which is being accomplished. Moreover, the invention is susceptible to compact packaging and can be readily calibrated for compatibility with the particular range of values of the input sensor parameters. Indeed, the invention can be incorporated, to a substantial extent, in its own integrated circuit, thereby promoting reliability and minimizing costs. The speed at which information is obtained is so fast that a number of sensors can be monitored by means of a multiplexing technique so that the amount of circuitry required is kept to a minimum. With the present invention a serious obstacle to the adoption of digital microprocessors for engine control application is removed.

The foregoing features, advantages and benefits of the invention, along with additional ones, will be seen in the ensuing description and claims which are to be considered in conjunction with the accompanying drawings which illustrate a preferred embodiment of the invention according to the best mode presently contemplated in carrying out the invention.

DESCRIPTION OF THE PREFERRED EMBODIMENT

Figure 1:
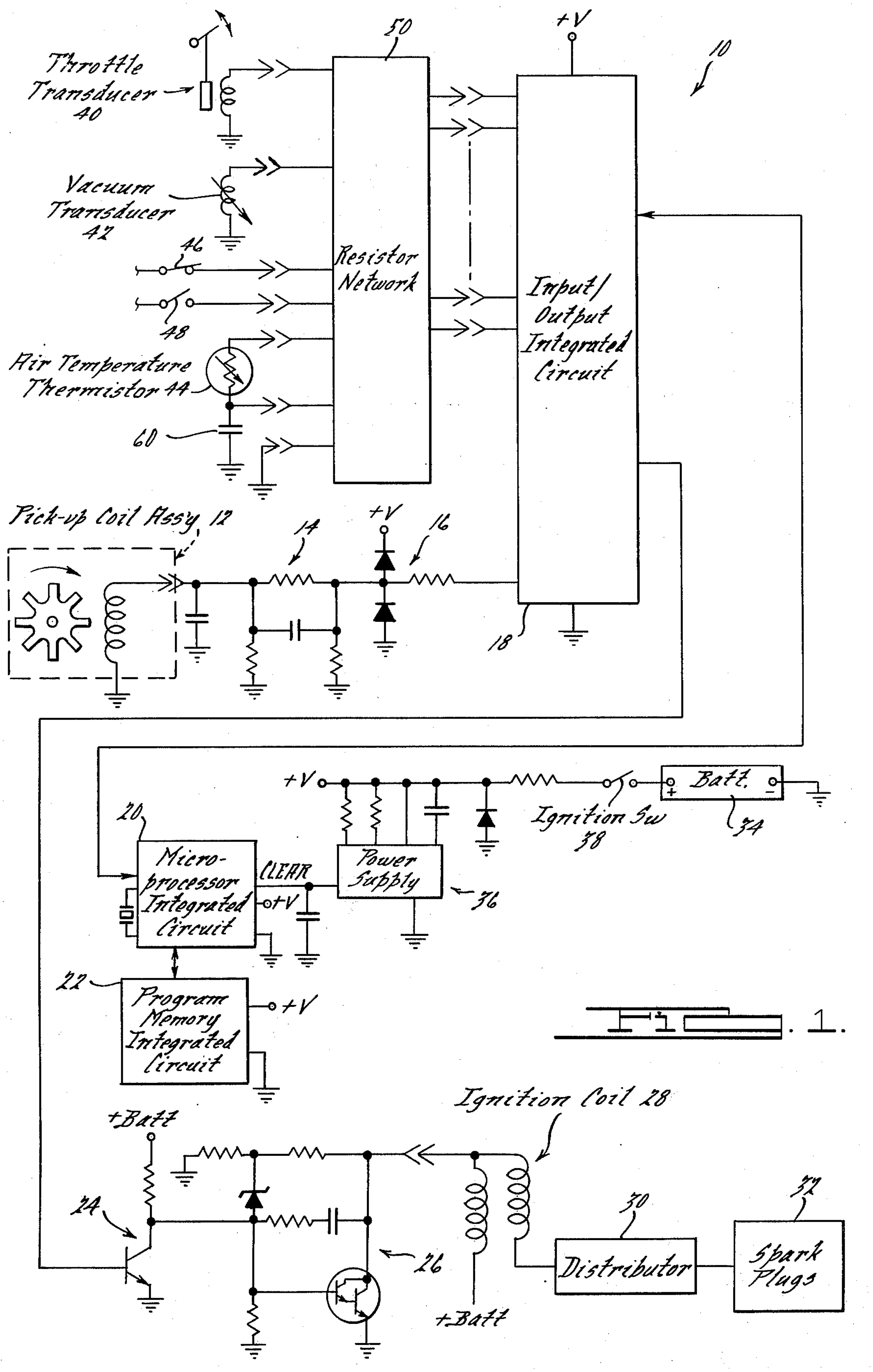
FIG. 1 is an electrical schematic diagram, partly in block diagram form, of an illustrative engine control system embodying principles of the present invention.

FIG. 1 discloses an illustrative preferred embodiment of engine control system 10 embodying principles of the present invention. The disclosed control system is an engine spark timing control system wherein the time of spark ignition in the cylinders of the engine is controlled in accordance with selected input signals which are representative of selected operating parameters. Briefly, a conventional pick-up coil assembly 12 is operatively coupled with the crankshaft of the engine to provide trigger pulses at predetermined angular positions of the crankshaft. The trigger pulses are supplied successively through a filter circuit 14 and a clipper circuit 16 to an input/output integrated circuit 18. Input/output integrated circuit 18 is a microcircuit device comprising a plurality of individual circuits which provide an interface, or buffer, between a microprocessor integrated circuit 20 and a program memory integrated circuit 22 on the one-hand and a number of discrete circuits on the other hand. Included among these discrete circuits are the pick-up circuit described above, a plurality of input circuits supplying signals representative of selected operating conditions, and an ignition circuit via which spark firing in the cylinders of the engine is accomplished. The ignition circuit comprises a predriver stage 24 followed by an output stage 26 which is operatively coupled with a conventional ignition coil 28 having primary and secondary windings. The secondary winding is connected via the usual distributor 30 with the spark plugs 32 of the engine. The primary winding is operatively connected with output stage 26. The overall operation of the system is such that in response to each trigger pulse from pick-up coil assembly 12, a selected one of the spark plugs is fired. The timing of ignition firing is controlled by microprocessor integrated circuit 20 which calculates from the selected input signals the correct duration of a time delay and then gives a firing signal to predriver stage 24 which is time delayed from the pick-up trigger signal by the amount of the calculated delay. Calculations for establishing the timing of spark ignition are made by microprocessor integrated circuit 20 and program memory integrated circuit 22 which are conventional commercially available devices, (for example RCA Corp.'s CDP 1802D Microprocessor, and CDP 1832D Read Only Memory, respectively) which are programmed in accordance with conventional techniques to carry out the spark timing calculations. Electrical power for the system is derived from the usual vehicle battery 34. In order to provide a regulated voltage potential of +V volts for the microelectronics, a conventional power supply circuit 36 is operatively connected as illustrated via the vehicle ignition switch 38 to be energized from battery 34 when the ignition switch is actuated to the on position. In addition to providing the regulated potential of +V volts, power supply 36 also provides a CLEAR signal used to clear microprocessor integrated circuit 20 when the ignition switch is first turned on to operate the engine.

The present invention provides a unique and efficient means for converting the information provided by the various sensors into a digital form which is utilized by microprocessor integrated circuit 20 in performing spark timing calculations. More specifically, sensor parameters data, which is representative of the selected engine operating parameters being monitored, is converted into binary words which are directly used by microprocessor integrated circuit 20 for calculations. In FIG. 1 the selected engine operating parameters which are monitored by the various sensors include the position of the engine throttle which is monitored by a sensor in the form of a variable inductance throttle position transducer 40; the magnitude of engine intake manifold vacuum which is monitored by a variable inductance vacuum transducer 42; and the ambient air temperature of air entering the engine for combustion which is monitored by an air temperature thermistor 44. Other parameters, or conditions, may be monitored such as engine idle condition by means of an idle sensing switch 46 and an engine overheating condition by a thermal switch 48. In order to provide the required conversion of sensor parameters to predefined numerical numbers, the input sensors are operatively coupled with input/output integrated circuit 18 by means of a resistor network 50 which contains a number of resistive type circuits each of which is operatively associated with a corresponding one of the input sensors. The network could include trim resistors, if needed. A more detailed schematic circuit diagram is shown in FIG. 2 with respect to throttle position transducer 40 and air temperature thermistor 44.

Pursuant to principles of the present invention each of the input sensors is operatively connected with additional circuitry to form a circuit which in response to a step function input signal applied thereto, provides an output signal in the form of an exponential transient whose time constant is representative of the resistive and reactive components constituting the circuit. In other words, each such circuit is characterized by a first order differential equation. Accordingly, in the illustration of FIG. 2, the inductance coil of transducer 40 is connected with three resistors 52, 54, and 56 which form an equivalent resistance 58 connected in series with the coil. The series circuit is characterized by first order differential equation exhibiting a time constant equal to the inductance of the coil divided by the resistance of the equivalent resistance 58. Likewise, thermistor 44 is connected in series with a capacitor 60 to form a series circuit characterized by a first order differential equation exhibiting a time constant equal to the resistance of thermistor 44 multiplied by the capacitance of capacitor 60. Resistors 52, 54, and 56 can be located in the resistor network 50 for packaging purposes, as illustrated. Capacitor 60 may be physically locatedin proximity to thermistor 44 which is disposed to measure the temperature of air which passes through the usual engine air intake system.

In the disclosed embodiment, a reference circuit is also provided for each input circuit. In the case of the series circuit defined by equivalent resistance 58 and the coil of transducer 40, a reference circuit comprising a pair of series connected resistors 62 and 64 is provided; in the case of the series circuit defined by thermistor 44 and capacitor 60 a reference circuit comprising a pair of series connected resistors 66 and 68 is provided. The location of these resistors may be as desired. Resistors 66 and 68 are shown to be located in the resistor network 50 while resistors 62 and 64 are included in circuit 18.

Figure 2:
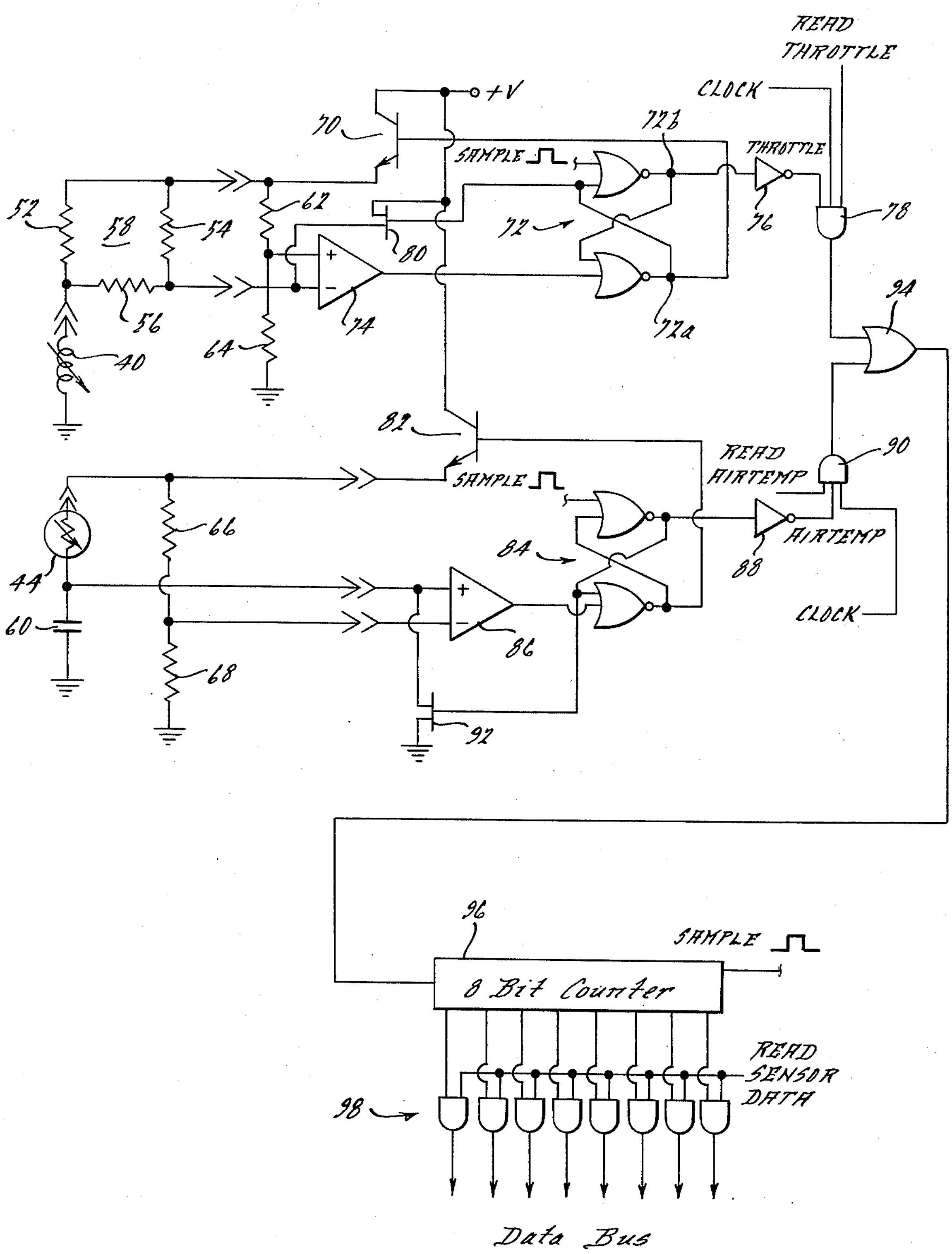
FIG. 2 is a more detailed electronic schematic diagram of a portion of FIG. 1 illustrating the present invention.

The remaining circuit devices shown schematically in FIG. 2 are contained in input/output integrated circuit 18. Briefly, for each input sensor circuit there is provided in integrated circuit 18 a corresponding sampling circuit. The sampling circuits are actuated at selected sampling times in accordance with control signals from microprocessor integrated circuit 20 whereby data from the corresponding sensors, representative of the instantaneous values thereof, is developed in binary form and supplied to microprocessor integrated circuit 20 for use in spark timing calculations. By way of example, the sensor circuits may be sampled sequentially in a given order so that data is effecitvely generated by multiplexing.

The sampling circuit associated with throttle position transducer 40 comprises an NPN transistor 70, a flip-flop 72, a comparator 74, an inverter 76, an AND gate 78 and a field effect transistor (FET) 80, connected as schematically shown. An almost identical sampling circuit for thermistor 44 comprises an NPN transistor 82, a flip-flop 84, a comparator 86, an inverter 88, an AND gate 90, and a FET 92. The outputs of all sampling circuits are connected to corresponding inputs of an OR gate 94 whose output connects to an 8-bit counter circuit 96. A set of eight AND gates 98 is operatively coupled with counter circuit 96 whereby each of the eight output bits of circuit 96 connects to one input of a corresponding AND gate. The outer inputs of the AND gates are connected together to receive a control signal called READ SENSOR DATA supplied from microprocessor integrated circuit 20. The eight outputs of the set of AND gates form a data bus which supplies an eight bit word to microprocessor integrated circuit 20. This word represents the binary equivalent of a sensor parameter.

A number of control signals are supplied to input/output integrated circuit 18 from microprocessor integrated circuit 20. These control signals include, in addition to the READ SENSOR DATA signal, a SAMPLE signal, a CLOCK signal, a READ THROTTLE signal, and a READ AIRTEMP signal.

The sampling circuit associated with throttle position transducer 40 is described as follows with reference to both FIGS. 2 and 3. Transistor 70 and flip-flop 72 are arranged to apply a step voltage across equivalent resistor 58 and the coil of transducer 40. This is accomplished in part by connecting the set output terminal **72*a* of flip-flop 72 to the base of transistor 70, by connecting the collector of transistor 70 to the +V supply terminal, and by connecting the emitter of transistor 70 to equivalent resistance 58 as shown in the drawing. Prior to the occurrence of the SAMPLE signal, the signal appearing as terminal 72*a* is generally at ground potential (i.e. logic "O"). However, when the sampling circuit is activated by the SAMPLE signal, the flip-flop is set and the signal at terminal 72*a* rises to a positive voltage of approximately +V volts (i.e. logic "1") whereby the +V supply voltage less the collector-emitter drop across transistor 70 is applied across the series combination of equivalent resistance 58 and the coil of transducer 40. It will be observed that resistors 62 and 64 are connected from the emitter of transistor 70 to ground so that the step voltage signal is applied across these two resistors at the same time that it is applied across equivalent resistor 58 and the coil of transducer 40. For selected fixed values of resistors 62 and 64, a reference voltage signal is established at the junction thereof and is supplied to the non-inverting input terminal of comparator 74. The voltage signal appearing at the junction of resistors 56 and 54 is supplied to the inverting input of comparator 74. Because the circuit defined by equivalent resistance 58 and the inductance of the coil of transducer 40 is characterized by a first order differential equation as explained above, the voltage signal supplied to the inverting input of comparator 74 is in the form of an exponentially decreasing voltage (for example, as shown in FIG. 4C). Comparator 74 compares the reference voltage against this exponentially decreasing voltage, and when the latter has decayed to a certain potential in relation to the reference, comparator 74 resets flip-flop 72. The resetting of flip-flop 72 renders transistor 70 non-conductive and hence removes the step function input which had been applied to the sensing circuit and the reference circuit. Because the inductance of transducer 40 is a function of the throttle position, the time constant of the associated sensing circuit is also a function of throttle position. Accordingly it will be appreciated that the duration for which flip-flop 72** stays in the set condition is a function of throttle position.

The signal from output terminal **72*b* of flip-flop 72 is supplied through inverter 76 to one input of AND gate 78. The signal at this input of AND gate 78 is called the THROTTLE signal. The THROTTLE signal represents the duration for which flip-flop 72 is in the set condition. The other inputs of AND gate 78 receive respectively the CLOCK signal and the READ THROTTLE signal. The CLOCK signal is a high frequency pulse signal (for example, 1 megahertz) which is generated by a circuit contained in microprocessor integrated circuit 20. The READ THROTTLE signal is a control signal also supplied from microprocessor integrated circuit 20 for causing throttle position data from transducer 40 to be entered in counter circuit 96. When both the THROTTLE and READ THROTTLE signals are given (i.e. both logic "1's"), the high frequency pulses of the CLOCK signal are conducted through gates 78 and 94 to counter circuit 96**. The counter circuit counts these clock pulses until the THROTTLE signal terminates.

Because the THROTTLE signal represents the duration for which flip-flop 72 is in the set condition, the value of the binary count which is contained in counter circuit 96 when the THROTTLE signal terminates is representative of the throttle position. It should be pointed out that the duration of the READ THROTTLE signal is selected to be longer than the maximum possible duration of the THROTTLE signal to preclude the possibility of lost counts.

The SAMPLE signal is a control signal supplied by microprocessor integrated circuit 20 whose leading edge is utilized to set flip-flop 72 and to reset counter circuit 96. As can be seen from consideration of the waveforms of FIG. 3, the leading edges of the SAMPLE and READ THROTTLE signals are essentially concurrent. The SAMPLE is of a duration just long enough to set flip-flop 72 and reset counter circuit 96 at the beginning of the activation of the sampling circuit.

After the READ THROTTLE signal has terminated, microprocessor integrated circuit 20 generates the READ SENSOR DATA signal to cause the data contained in counter circuit 96 to appear on the data bus for transfer to circuit 20 for use in spark timing calculations. As indicated in FIG. 3, it is during this time that the throttle data is transferred to the microprocessor.

After the throttle data has been transferred to the microprocessor, data from thermistor 44 relating to the temperature of ambient air entering the engine is obtained. This is accomplished in an analogous manner to that described above for the throttle data. Accordingly, the next occurrence of the SAMPLE signal sets flip-flop 84 which in turn causes both the AIRTEMP signal to be given at the output of inverter 88 and transistor 82 to switch into conduction. Counter circuit 96 is also reset by the SAMPLE signal. The READ AIRTEMP signal is also given by circuit 20, and, therefore, pulses of the CLOCk signal are conducted via gates 90 and 94 to the input of counter circuit 96 to be counted.

When transistor 82 switches into conduction in response to the setting of flip-flop 84, a step voltage is applied both across the series connected thermistor 44 and capacitor 60 as well as across the series connected resistors 66 and 68. Capacitor 60 begins charging through thermistor 44 and transistor 82, and a reference signal appears at the junction of the two resistors. It will be observed that the junction of thermistor 44 and capacitor 60 is connected to the non-inverting input of comparator 86 while the reference signal is supplied to the inverting input of comparator 86. The reason for reversing the connections (from those for the throttle circuit) is that the transient exponential waveform at the capacitor-thermistor junction is a positively increasing voltage which increases along a negative exponential curve (for example, like the curves shown in FIG. 4D).

When the transient reaches a pedetermined level in relation to the reference signal, comparator 86 resets flip-flop 84. The resetting of flip-flop 84 both terminates the AIRTEMP signal and removes the step voltage signal applied to the sensing circuit. Accordingly, further counting of the pulses of the CLOCK signal by counter circuit 96 ceases, with the count contained in the counter circuit providing a measurement of the resistance of the thermistor and hence a measurement of ambient air temperature entering the engine. Thereafter the READ SENSOR DATA signal is given by microprocessor integrated circuit 20 to cause the air temperature data to be transferred to the microprocessor via the data bus.

Figure 3:
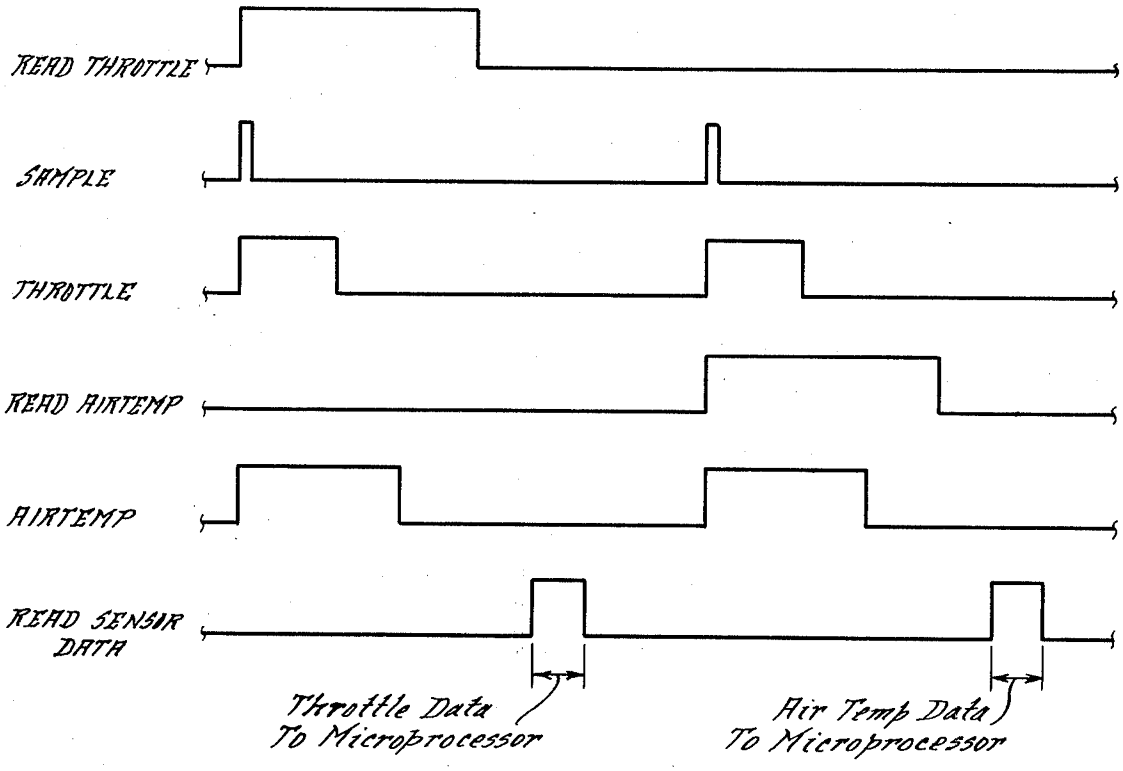
FIG. 3 is a timing diagram illustrating several electrical waveforms useful in explaining the operation of the circuit shown in FIG. 2.

From consideration of FIGS. 2 and 3, it can be seen that both the THROTTLE signal and AIRTEMP signal are given in response to each occurrence of the SAMPLE signal. With the illustrated multiplexing circuit arrangement however, only one counter circuit 96 is required. While it would be possible to have an individual counter circuit associated with each sensing circuit, the speed of operation of the circuitry is such in relation to the speed at which changes in the various engine operating parameters occur that accurate information for each of the measured input parameters can be obtained using only a single counter circuit 96 in circuit 18 with multiplexing. This is advantageous in minimizing the complexity and cost of the microcircuit. It will be appreciated that additional sensing circuits and associated sampling circuits can be included and can be multiplexed with the throttle position and ambient air temperature circuits which are shown in FIG. 2.

The purpose of providing FET 92 is to drain the charge from capacitor 60 after flip-flop 84 is reset. The purpose of providing FET 80 is to avoid toggling of comparator 74 due to noise when the input is off. The provision of the three resistors 52, 54 and 56 instead of a single resistor is so that resistor 56 can be connected between the coil of transducer 40 and the input of comparator 74 whereby the latter is protected against inductive kick from the coil. The provision of the three resistors however, insures that the transient is characterized by a time constant equal to the coil inductance drop by the equivalent resistance, and therefore resistor 56 is made very small in comparison to resistor 54. An advantage is gained by having the two input circuits to each comparator energized from a common switched source. For example in the case of the throttle circuit, because a step input must be applied across resistance 58 and the coil of transducer 40, an efficient technique is to switch the +V potential via transistor 70. By also connecting resistors 62 and 64 to the emitter of transistor 70, such circuit factors as fluctuations in supply voltage and $V_{BE}$ rop have no effect on the circuit accuracy.

Figure 4:
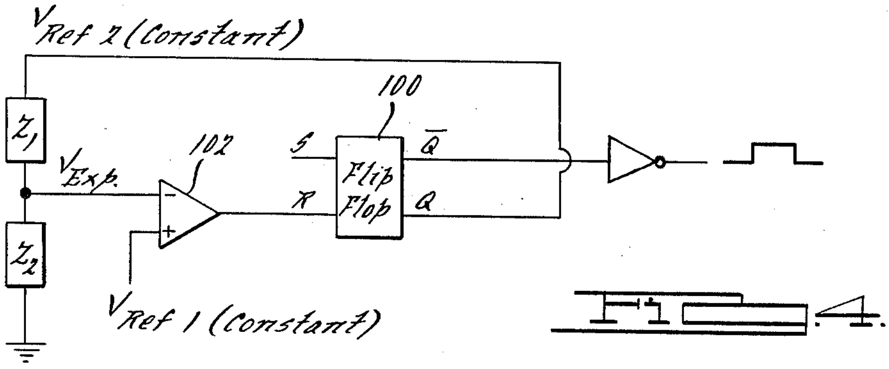
FIGS. 4, 4A and 4B should be considered together and constitute various species of the invention.
Figure 4A:
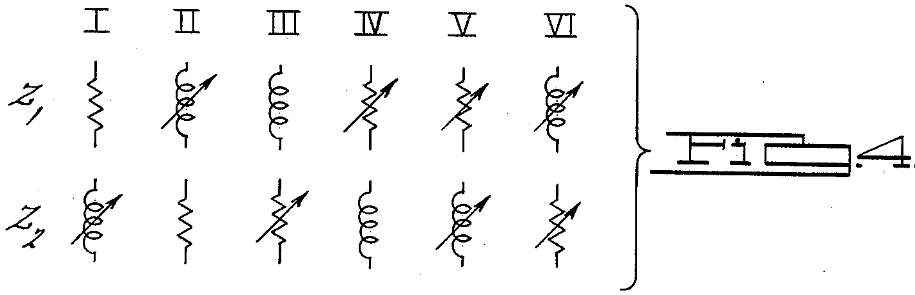
Figure 4B:
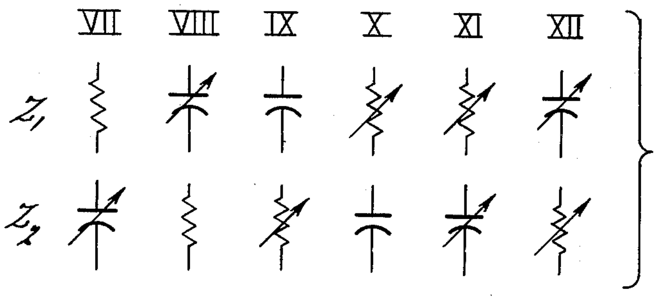
Figure 4C:
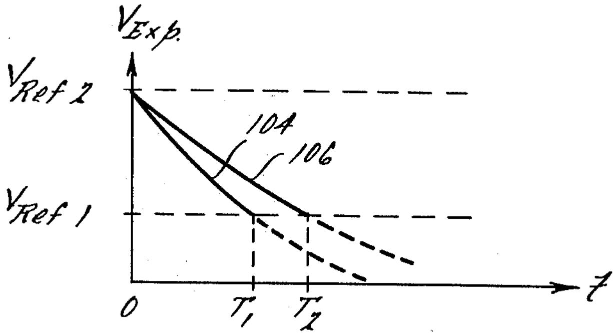
FIGS. 4C and 4D illustrate waveforms useful in explaining the operation of the species shown in FIGS. 4, 4A and 4B.
Figure 4D:
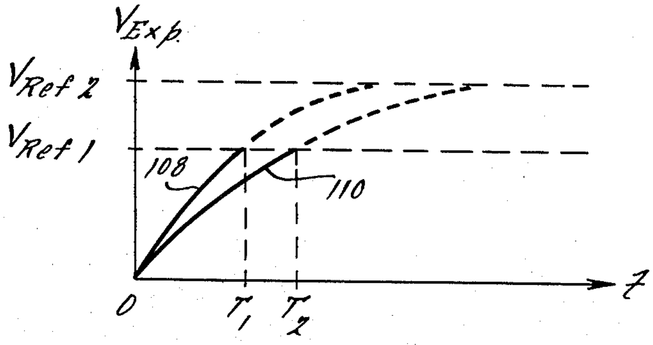

FIGS. 4, 4A and 4B should be considered together and illustrate various species of the invention. FIG. 4 illustrates in block diagram form a portion of an exemplary sampling circuit which comprises a sampling flip-flop 100, a comparator 102 and a pair of series-connected passive components $Z_1$ and $Z_2$. FIG. 4A illustrates six examples identified by the Roman numerals I through VI of the possible combinations for $Z_1$ and $Z_2$ using a resistive component and an inductive component. A constant positive reference potential $V_{Ref.1}$ is applied to the noninverting input of comparator 102. When flip-flop 100 is switched to the set condition, the positive voltage $V_{Ref.2}$ is applied across the series combination of circuit components $Z_1$ and $Z_2$. An exponential transient signal $V_{EXP}$ is supplied to the inverting input of comparator 102. The operation of the sampling circuit is like that described above in that when a predetermined relationship between $V_{EXP}$ and $V_{Ref.1}$ is attained, flip-flop 100 is reset to thereby terminate the transient. The duration for which flip-flop 100 is in the set condition is an indication of the L/R time constant associated with the two input circuit components $Z_1$ and $Z_2$. Examples I, IV and V, in response to the step input $V_{Ref.2}$ will exhibit a positively decreasing, negative exponential transient response $V_{EXP}$ such as illustrated by the two waveforms 104, 106 in FIG. 4C. The time constant of each of the waveforms 104, 106 is equal to the value of inductance divided by the value of resistance. Waveform 106 illustrates a larger time constant than waveform 104. Examples II, III, and VI will exhibit a positively increasing, negative exponential transient such as illustrated by waveforms 108 and 110 in FIG. 4D. The time constant exhibited by waveform 110 is larger than that exhibited by waveform 108. In Examples II, III and VI it becomes necessary to connect the junction of components $Z_1$ and $Z_2$ to the non-inverting input of comparator 102 nd to connect the $V_{Ref.1}$ to the inverting input.

FIG. 4B illustrates six examples, identified by the Roman numerals VII through XII, where $Z_1$ and $Z_2$ comprise resistive and capacitive components. The responses of examples VIII, IX and XII will be like those illustrated by the waveforms of FIG. 4C while the responses of Examples VII, X and XI will be like those illustrated by the waveforms in FIG. 4D. For Examples VIII, IX and XII the junction of components $Z_1$ and $Z_2$ connects to the inverting input of comparator 102 and the voltage $V_{Ref.1}$ connects to the non-inverting input. The comparator input connections are reversed for Examples VII, X and XI.

Values for the specific circuit components may be selected using standard design calculations to produce the desired timing characteristics. By judicious selection of circuit component values, the binary word output from counter circuit 96 can have a binary value equal to the parameter being measured, for example, in the case of throttle position transducer 40, a measurement of the transducer coil inductance in millihenrys. This is done in the circuit illustrated in FIG. 2 by selecting resistor values for resistors 62 and 64 such that the reference signal supplied to the non-inverting input of comparator 74 is equal to the step voltage at the emitter of transistor 70 divided by $e$, where $e$ equals 2.71828+. Because comparator 74 will reset flip-flop 72 when the exponential transient passes through the level of the reference signal, the duration of the THROTTLE signal is equal to the L/R time constant of the input sensing circuit. Because the CLOCK pulses are at a frequency of 1 megahertz, the number of CLOCK pulses counted during one time constant period will be equal to the coil inductance divided by the resistance of equivalent resistance 58. By making the equivalent resistance 58 equal to 1 kilohm, the number of pulses counted by the counter circuit will be equal to the coil inductance in millihenrys. Therefore, the binary word provided by counter 96 is conveniently scaled for direct use by microprocessor 20 so that the latter does not have to perform any further scaling. With this technique an exact measurement of inductance in millihenrys is obtained throughout the complete inductance range representing the range of possible throttle positions. Likewise, it is possible to obtain measurements of other parameters so that the binary word output of counter circuit 96 is exactly equal to the value of the parameter in the desired units.

Figure 5:
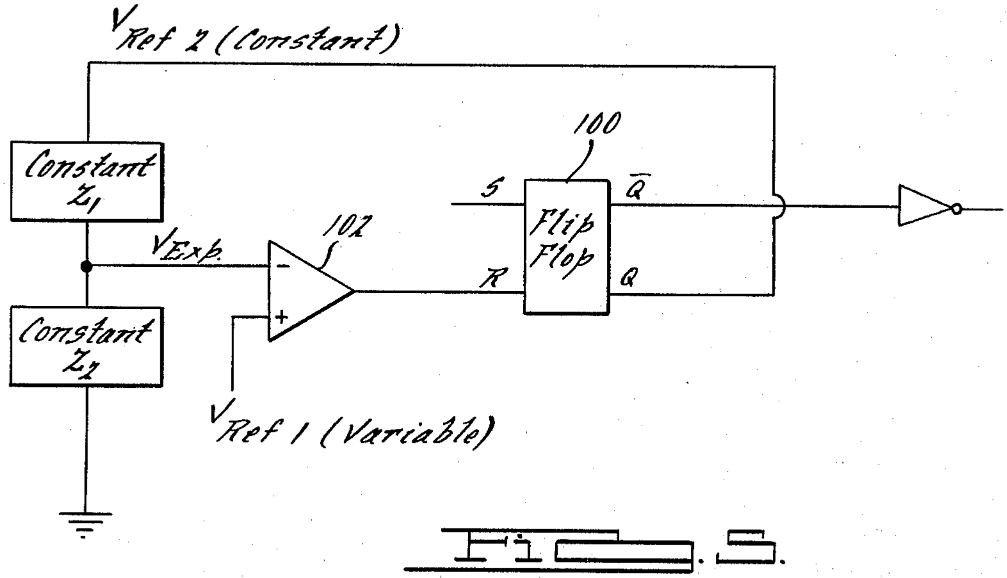
FIG. 5 is a schematic diagram illustrating another species of the invention.

FIG. 5 illustrates a further embodiment of the invention similar to the embodiments shown in FIGS. 4, 4A and 4B. In the FIG. 5 embodiment the series connected components $Z_1$ and $Z_2$, rather than being variable as in the FIG. 4, 4A and 4B embodiments, are constants. Thus, they define a fixed time constant. The step voltage $V_{Ref.2}$ which is delivered across the series connected components $Z_1$ and $Z_2$ is also constant. Therefore, the transient waveform $V_{EXP}$ which is applied to the one input of the comparator will have a constant transient response characteristic. In the FIG. 5 example, an input sensor provides a variable voltage signal $V_{Ref.\,1}$ to the other comparator input. Because the magnitude of the input signal $V_{Ref.\,1}$ changes, the point in time at which the exponential transient $V_{EXP}$ passes through the level established by the signal $V_{REF.\,1}$ also changes. Thus, the duration for which flip-flop 100 is set is a function of the signal $V_{Ref.\,1}$ and hence of the input parameter being measured. Although in this particular example, the binary word provided by the counter circuit 96 is representative of the input signal, the correlation between the value of the sensor parameter is a non-linear one unless the signal $V_{Ref.\,1}$ is calibrated inversely to the fixed exponential transient characteristic of the $Z_1 - Z_2$ circuit.

From the foregoing description, it can be seen that the invention provides input circuits for a digital engine control microprocessor which utilize existing analog sensors, yet provide binary word outputs which may be directly used by the microprocessor. Moreover, the disclosed circuitry utilized in association with the sensors requires only a relatively few number of circuit devices. The illustrated embodiment of a separate resistor network and an input/output integrated circuit for this circuitry is particularly advantageous, for it affords flexibility in matching the sensor input parameters to the electronics, yet may be mass produced very economically. While a preferred embodiment and various species of the invention have been disclosed, these should be considered in an illustrative rather than a limiting sense.

What is claimed is:

1. In an engine having an electronic control system for controlling an event associated with operation of the engine, the improvement comprising:

first circuit means which, in response to a step function signal applied thereto, provides a first signal in the form of an exponential transient;

second circuit means providing a second signal;

comparator circuit means having a pair of inputs and an output;

means for supplying said first signal to one input of said comparator circuit means;

means for supplying said second signal to the other input of said comparator circuit means;

means for varying, in accordance with an input condition useful in controlling said event, a selected circuit parameter of one of said first and second circuit means;

a digital counter circuit means adapted to digitally count pulses;

means for supplying pulses;

means for causing a step function signal to be applied to said first circuit means and for causing said digital counter circuit means to begin counting said pulses;

means operatively coupling the output of said comparator circuit means with said digital counter circuit means so that said comparator circuit means causes said digital counter circuit means to cease counting said pulses when a predetermined relationship between said first and second signals is attained; and means for utilizing the resultant count contained in said digital counter circuit means in controlling said event.

2. The improvement claimed in claim 1 wherein said means for varying, in accordance with an input condition useful in controlling said event, a selected circuit parameter of one of said first and second circuit means comprises means for varying a selected circuit parameter of said first circuit means.

3. The improvement claimed in claim 2 wherein said circuit parameter is selected from the group consisting of inductance, capacitance and resistance.

4. The improvement claimed in claim 1 wherein said means for varying, in accordance with an input condition useful in controlling said event, a selected circuit parameter of one of said first and second circuit means comprises means for varying a circuit parameter of said second means.

5. The improvement claimed in claim 4 wherein said circuit parameter is a voltage.

6. The improvement claimed in claim 1 wherein said means for varying, in accordance with an input condition useful in controlling said event, a selected circuit parameter of one of said first and second circuit means comprises a sensor connected in said first circuit means and operatively coupled to sense said input condition such that a parameter of said sensor varies in accordance with said input condition and said second circuit means comprises means providing said second signal as a fixed reference signal.

7. The improvement claimed in claim 6 wherein said first circuit means includes circuit means providing predetermined calibration between the parameter of said sensor and said first signal.

8. The improvement claimed in claim 1 wherein said means for supplying pulses comprises means for supplying said pulses at a constant frequency.

9. In an engine having an electronic control system for controlling an event associated with operation of the engine, the improvement comprising:

a sensor for providing a circuit parameter which is representative of the input conditions useful in controlling said event;

circuit means operatively coupled with said sensor and cooperating therewith to provide, in response to a step function input signal applied to said circuit means, an output signal in the form of an exponential transient whose time constant is representative of said circuit parameter, and hence of said input;

means for causing a step function input signal to be applied to said circuit means;

a digital counter circuit adapted to digitally count pulses;

a source of pulses;

means for causing said digital counter circuit to begin counting said pulses in timed relationship to the application of said step function input signal to said circuit means;

means for comparing said output signal of said circuit means against a reference signal and for causing said digital counter circuit to cease counting said pulses when a predetermined relationship between said reference signal and said output signal is attained; and means for utilizing the resultant count contained in said counter circuit in controlling said event.

10. The improvement claimed in claim 9 wherein said means for causing said digital counter circuit to begin counting said pulses in timed relationship to the application of said step function input signal to said circuit means comprises means for causing said digital counter circuit to begin counting said pulses substantially concurrently with the application of said step function input signal to said circuit means.

11. The improvement claimed in claim 9 wherein said sensor provides a circuit parameter selected from the group consisting of resistance, capacitance and inductance.

12. The improvement claimed in claim 9 wherein said circuit means comprises a circuit element, means connecting said circuit element and said sensor in a series circuit, and means providing for application of said step function input signal across said series circuit.

13. The improvement claimed in claim 12 wherein said sensor and said circuit element have a common junction in said series circuit and said output signal is provided at said common junction.

14. In an engine control system, means for converting an input sensor parameter into a binary word for use in a digital microprocessor comprising:

an input sensor providing a variable circuit parameter whose value is representative of a sensed condition useful in controlling the engine;

means cooperating with said sensor to form a sensing circuit characterized by a first order differential equation exhibiting a time constant which is representative of the value of said parameter;

means for energizing said sensing circuit to cause same to provide an output signal representative of said time constant;

a digital counter circuit adapted to digitally count pulses and provide a binary word output representative of the number of pulses counted;

a source of pulses;

means for causing said digital counter circuit to begin counting the pulses from said source in timed relation to the beginning of said output signal;

means for comparing said output signal against a reference and for causing said digital counter circuit to cease counting said pulses when a predetermined relationship between the reference and said output signal is attained;

and means via which the resulting count in said digital counter circuit may be supplied to a digital microprocessor.

15. The invention claimed in claim 14 wherein said means for energizing said sensing circuit to cause same to provide an output signal representative of said time constant comprises means for applying a step function energizing signal to said sensing circuit so that said output signal is in the form of a decaying exponential transient.

16. In an engine having an electronic control system which monitors a plurality of inputs and which in turns controls an event associated with operation of the engine, the improvement comprising:

a plurality of sensing circuits each of which is characterized by its own first order differential equation and exhibiting its own time constant which is representative of a corresponding input condition useful in controlling said event;

means for sampling the time constant of each of said sensing circuits by means of multiplexing;

a digital counter circuit;

means for causing said digital counter circuit to provide a binary word output representative of the time constant of each sensing circuit as it is sampled; and utilization means for utilizing the binary word outputs in controlling said event.

17. A circuit for converting an input sensor parameter into a binary word comprising:

an input sensor providing a variable circuit parameter whose value is representative of a sensed condition;

means cooperating with said sensor to form a sensing circuit characterized by a first order differential equation exhibiting a time constant which is representative of the value of said parameter;

means for energizing said sensing circuit with a step function input to cause same to provide an output signal in the form of a decaying exponential transient;

a digital counter circuit adapted to digitally count pulses and provide a binary word output representative of the number of pulses counted;

a source of pulses;

means for causing said digital counter circuit to begin counting the pulses from said source in timed relation to the beginning of said output signal;

means for comparing said output signal against a reference and for causing said digital counter circuit to cease counting said pulses when a predetermined relationship between the reference and said output signal is attained;

and means via which the resulting count in said digital counter circuit may be supplied to a utilization circuit.

18. A circuit as claimed in claim 17 wherein said source of pulses comprises means for supplying said pulses at a constant frequency.

19. A circuit as claimed in claim 17 wherein said means for causing said digital counter circuit to begin counting the pulses from said source in timed relation to the beginning of said output signal comprises means for causing said digital counter circuit to begin counting the pulses from said source substantially concurrently with the beginning of said output signal.

20. A circuit for converting a sensor parameter into a binary word comprising;

a sensing circuit comprising a sensor, a parameter of which is representative of an input conditon being sensed, and a circuit element connected therewith to endow said sensing circuit with a time constant representative of said parameter whereby said sensing circuit is adapted in response to a step function input signal applied thereto, to generate at its output an exponential transient signal;

a reference circuit providing at its output a reference signal;

a comparator circuit having a pair of inputs and an output;

means connecting the output of said sensing circuit to one input of said comparator circuit;

means connecting the output of said reference circuit to the other input of said comparator circuit;

a flip-flop circuit;

means connecting said flip-flop circuit with said comparator and sensing circuits for causing a step function input signal to be applied to said sensing circuit when said flip-flop circuit is in one of its two states, whereby the exponential transient signal is generated by said input sensing circuit, and for causing said flip-flop circuit to be switched by said comparator circuit to its other state when a predetermined relationship between said exponential transient signal and said reference signal is attained; and circuit means connected with said flip-flop circuit providing a binary word output signal representing the duration of time for which said flip-flop circuit is in its one state.

21. A circuit as claimed in claim 20 wherein said reference circuit is energized with said step function input signal to develop said reference signal.

22. A circuit as claimed in claim 21 wherein said step function input signal is delivered via a transistor whose conductivity is controlled by said flip-flop circuit.

23. A circuit for converting a sensor parameter into a binary word comprising;

first circuit means which, in response to a step function signal applied thereto, provides a first signal in the form of an exponential transient;

second circuit means providing a second signal;

comparator circuit means having a pair of inputs and an output;

means for supplying said first signal to one input of said comparator circuit means;

means for supplying said second signal to the other input of said comparator circuit means;

a sensor conneceted in one of said first and second circuit means to provide a sensor parameter which is representative of an input condition being sensed;

a digital counter circuit means adapted to digitally count pulses and to provide a binary word output representative of the count;

means for supplying pulses;

means for causing a step function signal to be applied to said first circuit means and for causing said digital counter circuit means to begin counting said pulses;

means operatively coupling the outputs of said comparator circuit means with said digital counter circuit means so that said comparator circuit means causes said digital counter circuit means to cease counting said pulses when a predetermined relationship between said first and second signals is attained; and means for supplying the binary word output to a utilization circuit.

24. In an engine having an electronic control system for controlling an event associated with operation of the engine, the improvement comprising:

first circuit means characterized by a first order differential equation;

second circuit means providing a reference signal;

means for varying, in accordance with an input condition useful in controlling said event, a selected circuit parameter of one of said first and second circuit means;

a digital counter circuit means adapted to digitally count pulses;

means for supplying pulses;

means for causing said first circuit means to execute a transient representative of the characterizing equation thereof;

means for causing said digital counter circuit means to begin counting pulses from said means for supplying pulses in timed relation to the initiation of said transient;

means for causing said digital counter circuit means to cease counting pulses from said means for supplying pulses when a predetermined relationship between said transient and said reference signal is attained;

and means for utilizing the resultant count contained in said digital counter circuit means in controlling said event.

25. In a circuit for converting a sensor parameter into a binary word wherein the sensor parameter is selected from the group consisting of inductance, resistance, and capacitance, and the sensor is connected in an input sensing circuit characterized by a first order differential equation and which executes a transient in response to the application of a transient-causing signal applied thereto to give a transient signal representative of the value of said parameter, the sub-combination comprising:

comparator means having two inputs on of which is adapted to receive said transient signal and the other of which is adapted to receive a reference signal, said comparator means also having an output;

a sample input for receiving a sample signal;

an output terminal for giving said transient-causing signal;

digital counter circuit means for digitally counting pulses;

circuit means operatively connected with the output of said comparator means, with said sample input, with said output terminal, and with said digital counter circuit means comprising means for causing the occurrence of said transient-causing signal at said output terminal in response to receipt of the sample signal at said sample terminal whereby the transient signal may be generated and compared by said comparator means against said reference signal, said comparator means being responsive to a predetermined relationship between the transient signal and the reference signal, means for causing said digital counter circuit means to begin counting in timed relationship with the receipt of said sample signal at said sample terminal, and means for causing said digital counter circuit means to cease counting when the predetermined relationship between the transient and reference signals is detected by said comparator means whereby the resultant count in said digital counter circuit means is representative of the value of said sensor parameter.

26. In a circuit for converting a sensor parameter into a binary word wherein the sensor parametr is selected from the group consisting of inductance, resistance, and capacitance and the sensor is connected in an input circuit characterized by a first order differential equation, the sub-combination as set forth in claim 25 wherein the reference signal will be caused to be applied to said comparator means by the transient-causing signal which appears at said output terminal.

* * * * *

UNITED STATES PATENT OFFICE
CERTIFICATE OF CORRECTION

PATENT NO. : 4,060,714

DATED : November 29, 1977

INVENTOR(S) : John P. Lappington and Leroy Shafer

It is certified that error appears in the above-identified patent and that said Letters Patent are hereby corrected as shown below:

The sentence at Column 2, lines 28, 29, and 30, should be the last sentence in the immediately preceding paragraph. Column 4, line 11, "locatedin" should read --located in--; line 55, "outer" should read --other--. Column 5, line 17, after "emitter" insert --voltage--. Column 6, line 18, after "SAMPLE" insert --signal--. Column 7, line 31, "drop" should read --divided--; line 42, "rop" should read --drop--. Column 8, line 11, "nd" should read --and--; line 43, "l" should read --one--; line 47, "l" should read --one--. Column 10, line 13, after "second" insert --circuit--; line 37, "the" should read --an--; same line, "conditions" should read --condition--. Column 11, line 50, "turns" should read --turn--. Column 13, line 20, "conneceted" should read --connected--; line 31, "outputs" should read --output--. Column 14, line 19, "on" should read --one--; line 52, "parametr" should read --parameter--.

Signed and Sealed this

*Sixteenth* Day of *May 1978*

[SEAL]

*Attest:*

RUTH C. MASON
*Attesting Officer*

LUTRELLE F. PARKER
*Acting Commissioner of Patents and Trademarks*